(12) United States Patent
Zhang et al.

(10) Patent No.: US 12,328,484 B2
(45) Date of Patent: Jun. 10, 2025

(54) MEDIA STREAM DELIVERY METHOD, CDN NODE SERVER, CDN SYSTEM, AND READABLE STORAGE MEDIUM

(71) Applicant: ZTE CORPORATION, Shenzhen (CN)

(72) Inventors: Xiaoqu Zhang, Shenzhen (CN); Rihong Wang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 224 days.

(21) Appl. No.: 17/786,465

(22) PCT Filed: Dec. 10, 2020

(86) PCT No.: PCT/CN2020/135267
§ 371 (c)(1),
(2) Date: Jun. 16, 2022

(87) PCT Pub. No.: WO2021/121123
PCT Pub. Date: Jun. 24, 2021

(65) Prior Publication Data
US 2023/0014940 A1    Jan. 19, 2023

(30) Foreign Application Priority Data
Dec. 16, 2019   (CN) .................. 201911295440.3

(51) Int. Cl.
*H04N 21/232*    (2011.01)
*H04L 65/612*    (2022.01)
(Continued)

(52) U.S. Cl.
CPC ....... *H04N 21/6437* (2013.01); *H04L 65/612* (2022.05); *H04N 21/232* (2013.01);
(Continued)

(58) Field of Classification Search
CPC ............ H04N 21/2393; H04N 21/438; H04N 21/6437; H04N 21/23113; H04N 21/23103; H04N 21/232; H04N 21/2323
See application file for complete search history.

(56) References Cited

U.S. PATENT DOCUMENTS 10,867,005 B1 *  12/2020  Villiers ............... H04L 43/0852
11,019,409 B2 *   5/2021  Lohmar ................ H04L 65/611
(Continued)

FOREIGN PATENT DOCUMENTS

CN     101068229 A    11/2007
CN     101478549 A     7/2009
(Continued)

OTHER PUBLICATIONS

Chinese Retrieval Report for Chinese Patent Application No. 2019112954403 dated Dec. 6, 2022.
(Continued)

*Primary Examiner* — Pinkal R Chokshi
(74) *Attorney, Agent, or Firm* — Knobbe, Martens, Olson & Bear, LLP

(57) ABSTRACT

Provided are a media stream delivery method, a content delivery network (CDN) node server, a CDN system and a readable storage medium. The media stream delivery method includes: receiving a data packet of a media stream; writing the received data packet of the media stream into a shared memory; and responding to a request of a user terminal, reading the data packet of the media stream requested by the user terminal from the shared memory, and sending the data packet.

13 Claims, 4 Drawing Sheets

(51) Int. Cl.
  *H04N 21/239* (2011.01)
  *H04N 21/438* (2011.01)
  *H04N 21/6437* (2011.01)
(52) U.S. Cl.
  CPC ..... *H04N 21/2323* (2013.01); *H04N 21/2393* (2013.01); *H04N 21/438* (2013.01)

(56) References Cited

U.S. PATENT DOCUMENTS

| | | | |
|---|---|---|---|
| 2008/0232361 A1* | 9/2008 | Kimiyama | H04L 65/611 725/144 |
| 2011/0191445 A1 | 8/2011 | Dazzi | |
| 2011/0258337 A1* | 10/2011 | Wang | H04L 65/65 709/231 |
| 2012/0198506 A1* | 8/2012 | Joe | H04N 21/6371 725/97 |
| 2013/0018978 A1* | 1/2013 | Crowe | H04L 67/2885 709/214 |
| 2016/0275042 A1 | 9/2016 | Pathak et al. | |
| 2017/0214612 A1 | 7/2017 | Leitner | |
| 2018/0027039 A1* | 1/2018 | Moorthy | H04N 21/2393 709/219 |
| 2021/0103505 A1* | 4/2021 | Tsuchiya | G06F 11/076 |

FOREIGN PATENT DOCUMENTS

| | | |
|---|---|---|
| CN | 106797388 A | 5/2017 |
| CN | 107066340 A | 8/2017 |
| CN | 107193673 A | 9/2017 |
| CN | 107404480 A | 11/2017 |
| CN | 107801083 A | 3/2018 |
| CN | 109547580 A | 3/2019 |
| CN | 110086571 A | 8/2019 |
| CN | 110149262 A | 8/2019 |
| WO | WO 2017/158541 A1 | 9/2017 |

OTHER PUBLICATIONS

Chinese Office Action for Chinese Patent Application No. 201911295440.3 dated Dec. 13, 2022.
Supplemental Search Report for Chinese Application No. 2019112954403 mailed on May 10, 2023.
Office Action for Chinese Application No. 201911295440.3 mailed on May 12, 2023.
Xiao Chen, "An Improved Method of Zero-Copy Data Transmission in the High Speed Network Environment", Multimedia Information Networking and Security, Nov. 18, 2009, pp. 281-284.
The Extended European Search Report for European Application No. 20901584.1 dated Nov. 23, 2023.
Li, Xia et al., "Comparative Research on High-Performance Network Packet Processing Methods in Servers", Computer Applications and Software, vol. 34, No. 11, Nov. 30, 2017.
International Search Report for International Application No. PCT/CN2020/135267, dated Mar. 8, 2021.

* cited by examiner

MEDIA STREAM DELIVERY METHOD, CDN NODE SERVER, CDN SYSTEM, AND READABLE STORAGE MEDIUM

CROSS-REFERENCES TO RELATED APPLICATIONS

This is a national stage application filed under 37 U.S.C. 371 based on International Patent Application No. PCT/CN2020/135267, filed Dec. 10, 2020, which claims priority to Chinese Patent Application No. 201911295440.3 filed with the China National Intellectual Property Administration (CNIPA) Dec. 16, 2019, the disclosures of which are incorporated herein by reference in their entireties.

TECHNICAL FIELD

The present application relates to the communication field, for example, a media stream delivery method, a content delivery network (CDN) node server, a CDN system and a readable storage medium.

BACKGROUND

A content delivery network (CDN) is a distributed network built and overlaid on a bearer network and composed of CDN node servers in different areas. The CDN is used for caching resources of an origin station to edge servers in multiple places for users to obtain nearby, so as to reduce the pressure on the origin server. To optimize the CDN global load, some CDN systems, such as CDN systems for media streams, have multilayer configuration.

With the rapid development of broadband Internet television businesses, in internet protocol television (IPTV) and over-the-top (OTT) technologies, CDN node devices need to provide channel live businesses and content back-to-origin direct playing businesses. For example, unicast live is a common business scene. In such a business scene, the CDN media processing software installed on the CDN node device needs to receive one path of media code stream from an encoder or an upper-level CDN node device or the origin station, and deliver the one path of media code stream, at the local node device, to a large number of user terminals needing the service. That is, the CDN media processing software needs to perform multipath delivery on the received one path of media code stream, and send the multiple pieces of media code streams to multiple user terminals needing the service, respectively.

However, according to the media stream delivery method in the related art, when sending a packet, a CDN node needs to copy cached data in the user mode to a network card driver memory in the kernel mode, and then sends the packet in the kernel mode to a user terminal through a network port. In this processing manner, the greater the number of users served by the CDN node, the greater the copy amount from the cache in the user mode to the cache in the kernel mode. As a result, a large amount of data copied from the user mode to the kernel mode consumes a great deal of device system performance. The greater the capability designed for the CDN node, the greater the corresponding system performance consumption, which greatly reduces the service efficiency of the CDN device. In the case of low service efficiency of the device, to improve the service capability of the CDN node, more node servers need to be configured, which increases the configuration cost of the CDN nodes.

SUMMARY

The present application provides a media stream delivery method, a Content Delivery Network (CDN) node server, a CDN system and a readable storage medium, so as to solve the technical problem that a large amount of data is copied from the cache in the user mode to the cache in the kernel mode in the media stream delivery process according to the related art.

A media stream delivery method is provided and includes the following.

A data packet of a media stream is received; a shared memory is established, and the received data packet of the media stream is written into the shared memory; and a request of a user terminal is responded to, and the data packet of the media stream requested by the user terminal is read from the shared memory for packet sending.

A CDN node server is further provided and includes a memory, a processor and a computer program stored in the memory and executable by the processor, where the processor, when executing the program, implements the preceding media stream delivery method.

A CDN system is further provided and includes an origin server, a CDN node server and a user terminal, where the node server includes a memory, a processor and a computer program stored in the memory and executable by the processor, where the processor, when executing the program, implements the preceding media stream delivery method.

A computer-readable storage medium is further provided. The computer-readable storage medium stores computer-executable instructions for executing the preceding media stream delivery method.

DETAILED DESCRIPTION

The present application is described below in conjunction with drawings and embodiments.

Although functional modules are divided in device schematic diagrams and logical sequences are illustrated in flowcharts, in some cases, steps illustrated or described may be performed in sequences different from those in divided modules in the device or in the flowcharts. The terms "first", "second" and the like herein are used for distinguishing between similar objects and are not necessarily used for describing a particular sequence or order.

Figure 1:
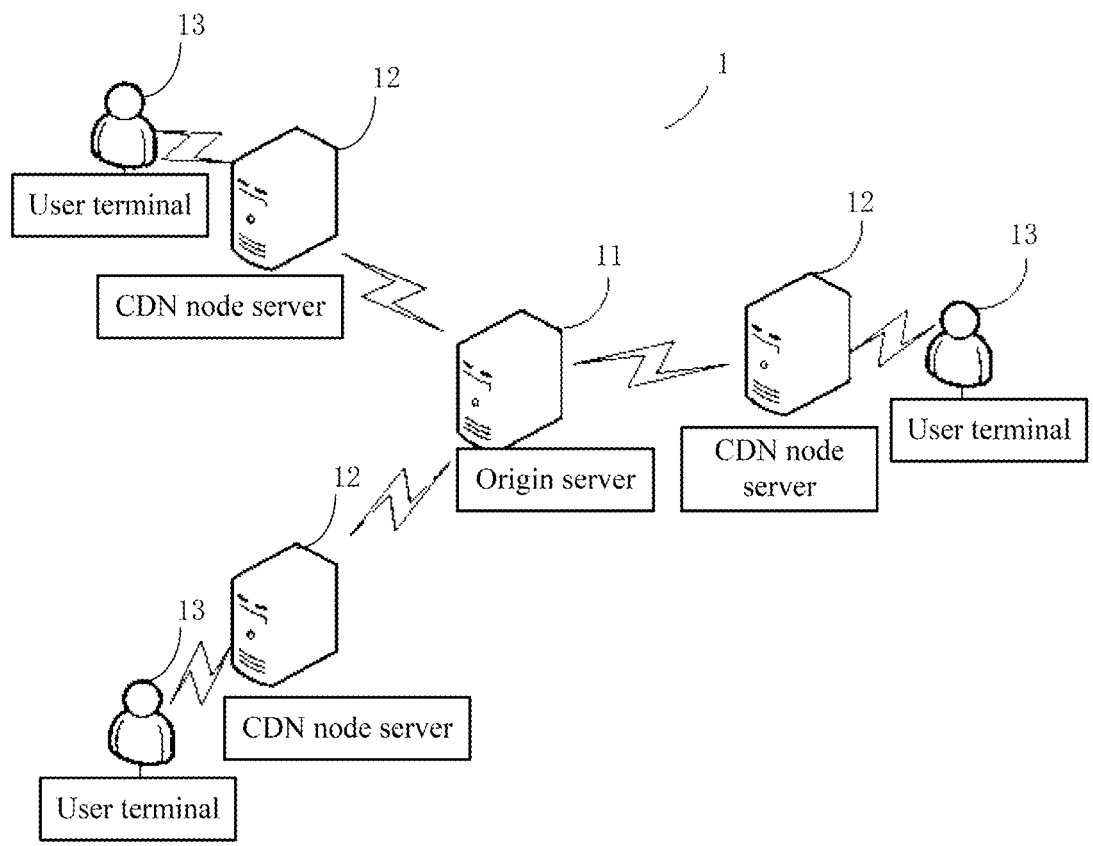
FIG. 1 is a schematic showing of a CDN system.

As shown in FIG. 1, a Content Delivery Network (CDN) system 1 includes a origin server 11, CDN node servers 12 and user terminals 13. The origin server 11, the CDN node servers 12 and the user terminals 13 are connected through the Internet.

In the example shown in FIG. 1, the origin server 11 and the CDN node servers 12 may be various servers having network connections, and the user terminals 13 may be any terminal device accessing the network. The origin server 11, also referred to as an origin station, may be the same as or different from the CDN node servers 12 in hardware and software, but provides the distributed content first. The CDN node servers 12, also referred to as node devices, are cache servers on which copies of the content on the origin server 11 are stored. These cache servers are distributed to places or networks where user access is relatively concentrated. The user terminals 13 may be handheld devices having a wireless communication function, including terminals which a Subscriber Identity Module (SIM) card is inserted into or which adopts the embedded-SIM (e-SIM) technology, such as a mobile phone, a tablet, a laptop, etc., and also including a desktop computer device, a multimedia device or other processing devices connected to a wireless modem, a vehicle-mounted device, a wearable device, a terminal in the 5th-Generation mobile communication technology (5G) network, etc. Users access their desired contents through the software, such as a browser and video playing software, installed on the user terminals 13.

Figure 2:
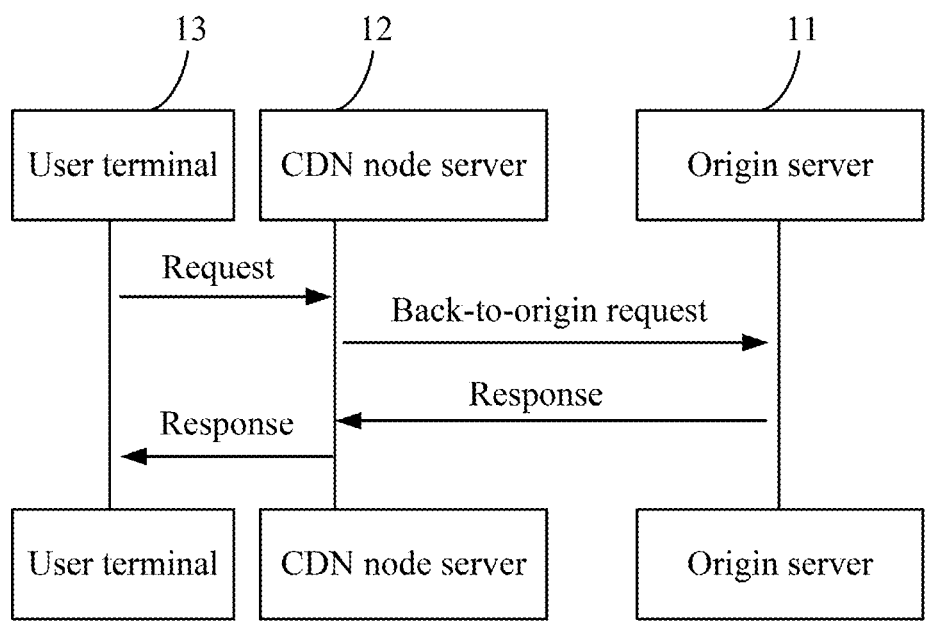
FIG. 2 is a diagram showing a content request flow of the CDN system in FIG. 1.

In the network where the CDN system 1 is deployed, when a user accesses the content, the CDN system 1 uses the global load technology to parse so as to direct the user's access to a nearest normal-working cache server (a CDN node server 12), and the CDN node server 12 directly responds to the user's content access request, that is, the parsed CDN node server 12 delivers the content to the user terminal 13 of the user. If the parsed CDN node server 12 does not cache the content for response, or the cache has expired, the parsed CDN node server 12 acquires the content for response back from the origin server 11 for content delivery. For example, as shown in FIG. 2, when the user terminal 13 receives a content request instruction of the user, for example, when the user opens a video link on the browser of the user terminal 13 and drags and drops the video, the browser first checks whether a local cache exists, or whether the local cache expires. It is assumed that no local cache exists or the cache expires, and then a data request is initiated to the CDN node server 12. When the CDN node server 12 receives the data request, the CDN node server 12 determines whether the data cached on the CDN node server 12 expires. If the cached data does not expire, the cached data is directly returned to the user terminal 13; if the cached data expires, the CDN node server 12 sends a back-to-origin request to the origin server 11, pulls the latest data from the origin server 11, updates the local cache, and returns the latest data to the user terminal 13, so that the user finally accesses the required content.

In different CDN systems 1, the CDN node servers 12 may have multilayer configuration. For example, a three-layer structure may include a central layer, a regional layer and an edge layer.

In the CDN system 1, CDN node servers 12 which directly face users and are designated by the global load manager of the CDN system 1 to provide content services to the user terminals 13 are all deployed at the position close to the user terminals 13, that is, at the so-called edge position of the CDN network, and this layer is referred to as the edge layer. In the CDN system 1, CDN node servers 12 which do not directly face the user terminals 13 are deployed at the central layer, and these CDN devices are responsible for global management and control, while also saving the most cached contents. When the CDN node server 12 at the edge layer fails the cache hit, the CDN node server 12 at the edge layer needs to request from the CDN node server 12 at the central layer; when the CDN node server 12 at the central layer also fails the cache hit, the origin server 11 needs to be requested from. Differences exist in the design of different CDN systems 1, and the CDN node servers 12 at the central layer may also have the capability to directly serve the user terminals 13, or may only provide services to the CDN node servers 12 at the next layer. For some relatively large CDN systems 1, the edge layer requests too much contents from the central layer, resulting in too much load pressure on the central layer. In this case, an intermediate buffer layer, referred to as the regional layer, needs to be deployed between the central layer and the edge layer. The CDN node servers 12 at the regional layer are responsible for the management and control of all CDN node servers 12 at the edge layer in a region, and also provide more cached contents for the CDN node servers 12 at the edge layer to access.

Figure 3:
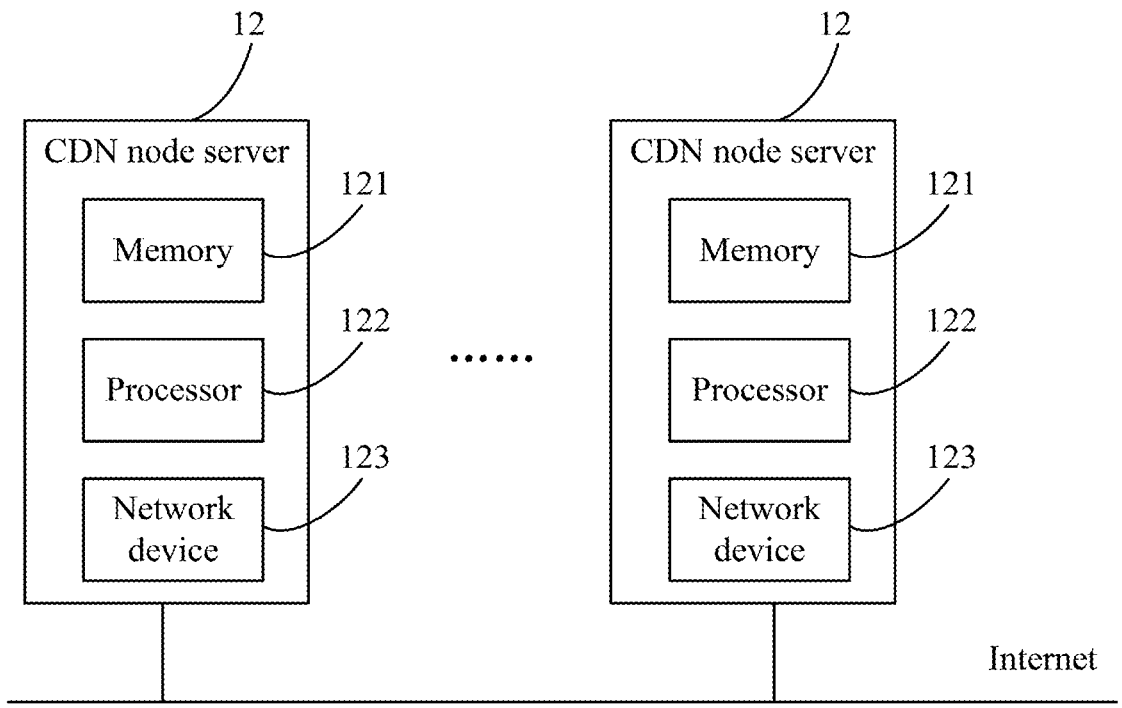
FIG. 3 is a diagram showing the structure of a CDN node server.

FIG. 3 shows a CDN node server 12 which has a processor 122, a memory 121 and a network device 123. In this example, the CDN node server 12 is connected to the Internet via the network device 123 and runs in a Linux environment, and the corresponding software is installed and runs on the CDN node server 12 to implement the content delivery function. For example, the media processing software is installed and runs on the CDN node server 12 to implement the media code stream reception and delivery function. The memory 121 includes a memory, a mechanical hard disk, and/or a solid-state hard disk. The network device 123 includes a wired network card and/or a wireless network card.

According to the media stream delivery method in the related art, the general Input/Output (I/O) functions of Linux, that is, recvmsg and sendmsg, are used for data transceiving at designated network ports. In general, the media processing software using the method may include a media packet reception module, a media packet sending module, a media transcoding module, a media encapsulation module, etc. The media packet reception module uses the recvmsg function to receive the content (a media code stream) for caching; the media transcoding module transcodes the cached media code stream to generate a designated media code stream; the media encapsulation module encapsulates and packetizes the generated media code stream; and then the media packet sending module uses the sendmsg function to send the packet to a user terminal according to a request of the user terminal.

Figure 4:
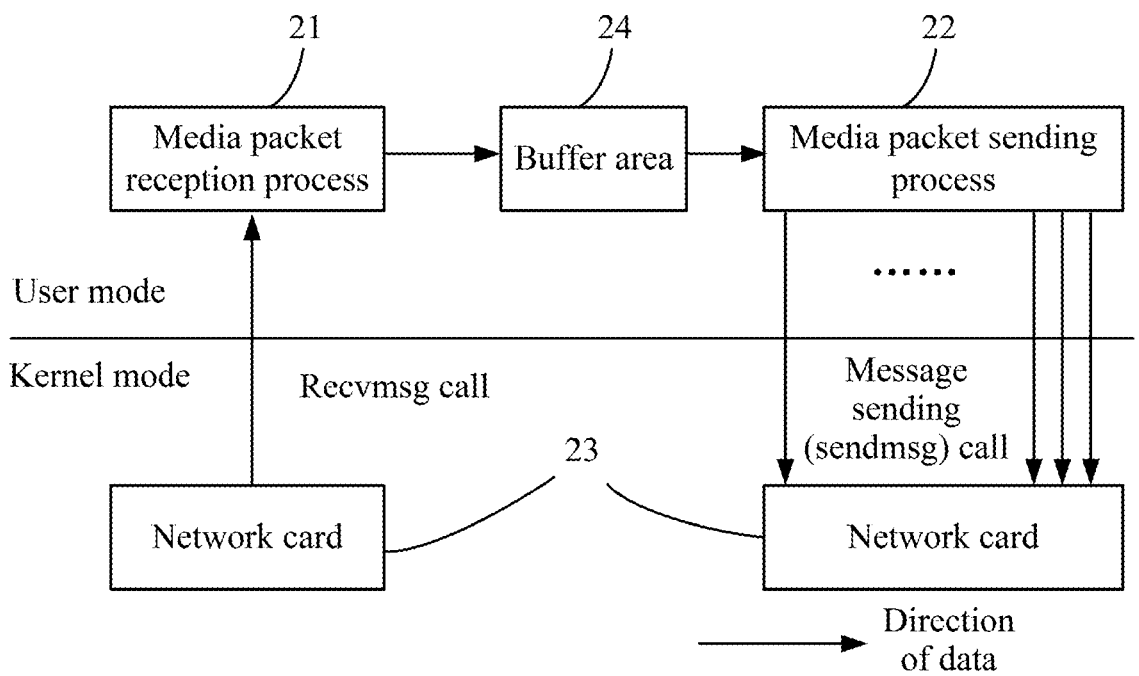
FIG. 4 is a diagram showing the flow of a media stream delivery method in the related art.

FIG. 4 shows an example in which a CDN node server 12 delivers the content by using the media stream delivery method in the related art in the case of back-to-origin (for simplicity, this example does not involve transcoding). When a user terminal 13 accesses a content, if the CDN node server 12 that is parsed does not cache the content for response, or the cache expires and thus the CDN node server 12 needs to acquire the media content back from the origin server 11, the media processing software needs to use the recvmsg function through the packet reception module thereof to receive a packet from a network card 23 of the device, and then the media packet sending module calls the sendmsg function to send the packet to the user terminal according to the request of the user terminal. When a large number of user terminals request services, the sendmsg interface is called multiple times for packet sending.

However, the Linux operating system has an architecture divided into the user mode and the kernel mode for security reasons. The kernel is essentially a type of software that controls the hardware resources of a computer and provides an environment for upper-layer applications running on. The user mode is the activity space of the upper-layer applications, and the execution of the applications must rely on the resources provided by the kernel, including central processing unit (CPU) resources, storage resources, I/O resources, etc. In order for the upper-layer applications to have access to these resources, the kernel must provide the upper-layer applications with an interface to access, that is, the system call. Preceding recvmsg and sendmsg are interfaces to access such I/O resources. The media processing software for implementing the content delivery is generally a software task/process running in the user mode of the Linux system, while the network card driver program of the device is a software task/process running in the kernel mode of the Linux system, and data exchange between the media processing software and the network card driver program is performed between the kernel mode and the user mode.

According to the flow in the related art shown in FIG. 4, on the CDN node server 12, a media packet reception process 21 running in the user mode needs to call the recvmsg function to receive a packet from a network port of the device. When receiving the packet, the network card driver process of the network card 23 receives the data packet from the network port and writes the data into a packet reception buffer area of the network card, and this data operation is performed in the kernel mode (the principle and process of the network card driver receiving the packet are well known and not repeated here). The media packet reception process 21 copies the data in the packet reception buffer area of the network card to a data cache area 24 of the media processing software through the recvmsg function (the principle and process of an application acquiring a data interface and receiving the data through the recvmsg function are also known and not repeated here) for the media processing software to access and process, and the media packet reception process 21 of the media processing software runs in the user mode. In other words, in the media stream delivery technology, a process exists of copying the media packet in the packet reception buffer area of the network card driver in the kernel mode of the Linux system to the application cache of the media processing software in the user mode. For the process of calling recvmsg to receive the packet from the network card driver, in the scene of the media stream delivery, only one piece of media code stream is received, that is, only one time of copy from the kernel mode to the user mode is performed, so that the impact on application performance is relatively small.

However, when the corresponding user requests content delivery, a media packet sending process 22 running in the user mode also needs to call the sendmsg function to send the packet to the user terminal through the network port of the device. When the packet is sent, the media packet sending process 22 running in the user mode calling the sendmsg interface to send the packet needs to first copy data in an application cache area thereof in the user mode to a packet sending buffer area of the network card driver process in the kernel mode, and then the network card driver process reads data from the packet sending buffer area thereof and sends the packet in the form of a circular queue (the principle and process of the network card sending the packet are known and not repeated here). The packet sending is similar to the packet reception and also implies a time of data copy. But at this time, the data of the application cache in the user mode is copied to the network card driver buffer area in the kernel mode, as shown in FIG. 4.

In this processing manner, the greater the number of users served by the CDN devices and the more content service requests, the greater the copy amount from the cache in the user mode to the cache in the kernel mode. As a result, a large amount of data copied from the user mode to the kernel mode consumes a great deal of system performance. When a single device of the CDN node server 12 has the service capability of only several G, this processing manner seems to have a relatively small impact on the CDN system. As the service capability designed for the CDN device increases, the service capability has reached the large data traffic such as 60 G, 90 G or even 180 G. However, according to the original processing method, the higher the capability designed for the device, the greater the system consumption, and thus a very large impact is generated on the service efficiency of the CDN device. In the case of low service efficiency of the device, to improve the service capability of the CDN node, more device servers need to be configured, which increases the configuration cost of the CDN nodes.

Figure 5:
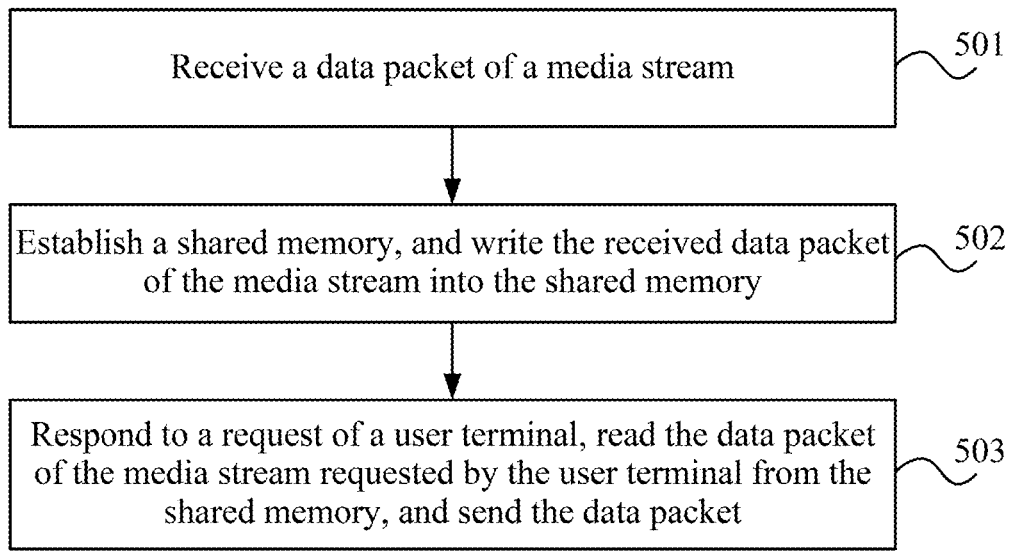
FIG. 5 is a flowchart of a media stream delivery method according to an embodiment of the present application.

As shown in FIG. 5, an embodiment of the present application provides a media delivery method including the following.

In 501, a data packet of a media stream is received.

In 502, a shared memory is established, and the received data packet of the media stream is written into the shared memory.

In 503, a request of a user terminal is responded to, the data packet of the media stream requested by the user terminal is read from the shared memory, and the data packet is sent.

In an embodiment of the present application, media processing software, such as streaming media service software, is installed and run on a CDN node server 12, and includes functional modules such as a media packet reception module and a media packet sending module. When a user terminal 13 initiates a content request, the global load manager of the CDN system 1 parses and designates a CDN node server 12 closest to the user terminal 13 to provide content/data services. When the CDN node server 12 receives the data request, the CDN node server 12 determines whether the data cached thereon expires. If the cached data does not expire, the cached data is directly returned to the user terminal 13; if the cached data expires, the CDN node server 12 sends a back-to-origin request to the origin server 11, pulls the latest data from the origin server 11, updates the local cache, and returns the latest data to the user terminal 13. The user terminal 13 thus obtains the data packet required thereby, and displays the required content to the user after decoding.

The content may be any information carried on media such as videos, audios, animations, images, and text. In the Internet, media contents may be in the form of streaming media, that is, media content data is compressed and then transmitted in segments in the form of streams over the network. In an embodiment of the present application, media code streams may be a Real-time Transport Protocol (RTP) packet or a Transport Stream (TS) packet.

In 501, in the case of back-to-origin, the streaming media service software installed on the CDN node server 12 receives, when running, the packet from a network card 23 of the device through the recvmsg interface. When the packet is received, a network card driver process receives the data packet from a network port and writes the data into a packet reception buffer area of the network card 23.

In 502, the shared memory is established, so that a packet sending buffer area of the network card driver process in the kernel mode and an application cache area of the streaming media service software in the user mode share a piece of memory area. A media packet reception process of the streaming media service software copies the data in the packet reception buffer area of the network card to the shared memory through the system call recvmsg for the streaming media service software to process and cache.

In 503, when the streaming media service software on the CDN node server 12 receives the service request of the user terminal, since the kernel packet sending buffer area of the network card driver process shares a piece of memory with the application cache area of the streaming media service process, the network card driver process may directly read the media content requested by the user terminal from the shared memory through a system call provided by the system or customized for packet sending.

In the embodiment, the inter-process communication (IPC) is achieved through the shared memory. It is not required to perform copying of data between the user mode and the kernel mode, and the memory can be directly accessed, so that the efficiency of the CDN node is increased.

Figure 6:
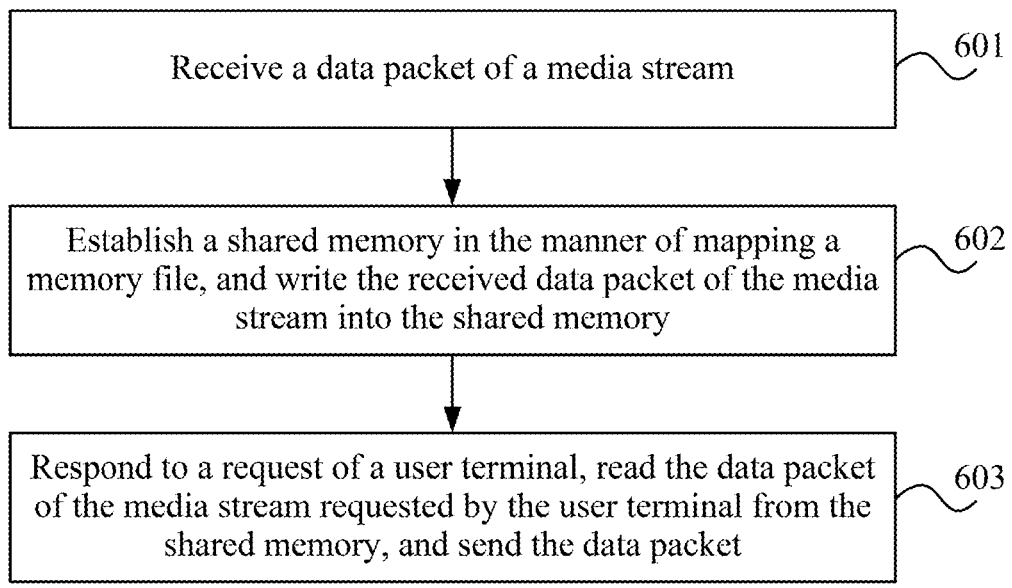
FIG. 6 is a flowchart of another media stream delivery method according to an embodiment of the present application.

FIG. 6 shows a media stream delivery method according to another embodiment of the present application. The method includes the following.

In 601, a data packet of a media stream is received.

In 602, a shared memory is established in the manner of mapping a memory file, and the received data packet of the media stream is written into the shared memory.

In 603, a request of a user terminal is responded to, the data packet of the media stream requested by the user terminal is read from the shared memory, and the data packet is sent.

In 601, streaming media service software installed on a CDN node server 12 receives, when running, the packet from a network port of the device through the recvmsg interface. When the packet is received, a network card driver process receives the data packet from the network port and writes the data into a packet reception buffer area of the network card.

In 602, the shared memory is implemented through a memory mapping function mmap provided by Linux. mmap maps the content of the file to a segment of memory, and a process may access the file by accessing the segment of memory, without requiring other system calls (such as read and write) to operate. The mmap ( ) system call allows processes to achieve the shared memory by mapping the same common file. In the embodiment, a file is created by using an open system call, and then the mmap operation is performed to map the file to the memory address space of a streaming media service process and the memory address space of the network card driver process, respectively, so as to achieve the shared memory. Thus, when data is written in the memory area of the streaming media service process where the file is mapped to, since a memory area of the network card driver process also has a mapping relationship with the file, it can also be regarded as that the data is written in the memory area of the network card driver process area where the file is mapped to. In other words, in the embodiment, it can also be regarded as that an application cache area of the streaming media service process is set as a piece of memory shared with a packet sending buffer area of the network card driver process by using the mmap function, and when the streaming media service process receives a packet, writing data in the shared memory is equivalent to simultaneously writing the data in the buffer area of the network card driver process.

The mmap function is defined as:
include <sys/mman.h>
void *mmap (void *addr, size_t length, int prot, int flags, int fd, off_t offset).

The parameter addr designates that a file should be mapped to the starting address of a process space, the parameter length refers to the number of bytes mapped to the address space of a call process, the parameter prot designates the access permission of the shared memory, the parameter flags designates whether the type of a mapping object, the mapping option and the mapping page can be shared, the parameter fd refers to a file descriptor to be mapped to the process space and is generally returned by open ( ) and the parameter offset represents an offset.

In 603, the streaming media service software responds to the service request of a user terminal 13, and a media packet sending module of the streaming media service software directly reads the data packet of the media code stream from the shared memory through a system call provided by the system or customized for sending. Since the memory file cache mapped to the shared memory is already in the Linux kernel mode, when the CDN node server 12 delivers a media code stream to a large number of users for services, the CDN node server 12 reads contents from the mapped memory file for packet sending to the user, which solves the problem that a large amount of data needs to be copied from the user mode to the kernel mode.

Figure 7:
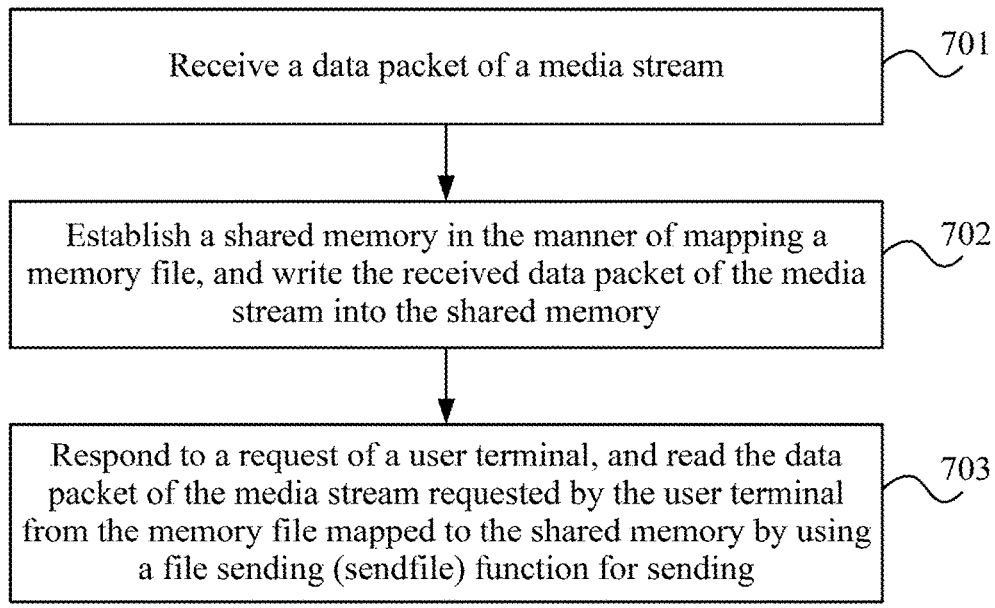
FIG. 7 is a flowchart of another media stream delivery method according to an embodiment of the present application.

FIG. 7 shows a media stream delivery method according to another embodiment of the present application. The method includes the following.

In 701, a data packet of a media stream is received.

In 702, a shared memory is established in the manner of mapping a memory file, and the received data packet of the media stream is written into the shared memory.

In 703, a request of a user terminal is responded to, and the data packet of the media stream requested by the user terminal is read from the memory file mapped to the shared memory by using a sendfile function for sending.

Figure 8:
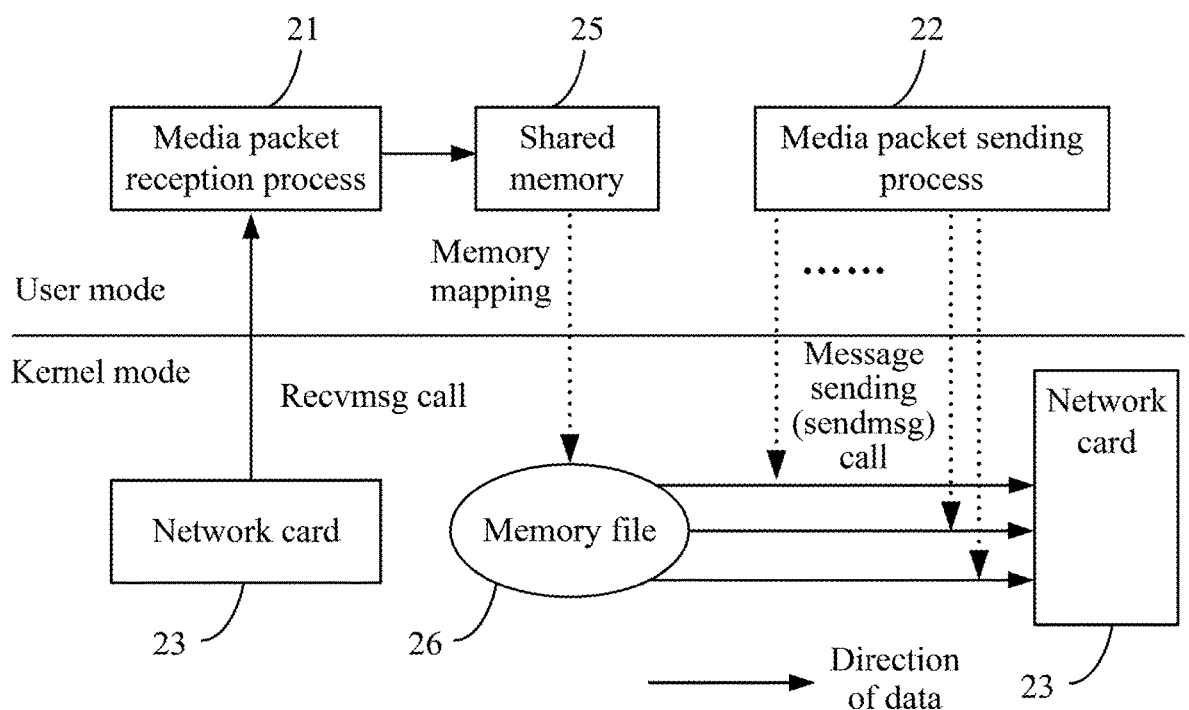
FIG. 8 is a diagram showing the flow of the media stream delivery method in FIG. 7 according to an embodiment of the present application.

FIG. 8 is a diagram showing the flow of the media stream delivery method shown in FIG. 7. In 701, a media packet reception process 21 of streaming media service software installed on a CDN node server 12 receives the packet from a network card 23 through the recvmsg interface. When the packet is received, a network card driver process receives the data packet from the network card 23 and writes the data into a data cache area in the kernel mode of the network card 23. In 702, the shared memory 25 is established through the memory mapping function mmap provided by Linux, and a media packet reception process 21 copies data in a packet reception buffer area of the network card to the shared memory 25 through the sy stem call recvmsg. The shared memory 25 is mapped as a memory file 26 at the same time to achieve content caching. In 703, since the shared memory 25 has been mapped as the memory file 26, the sendfile interface may be used to directly read the contents requested by the terminal from the cached memory file 26, and the contents are submitted to the network card driver process for direct packet sending.

The advanced I/O function, that is, the sendfile function, of Linux may transfer data between two file descriptors (the operation is completely performed in the kernel), so that data copying between the buffer area in the kernel mode and the buffer area in the user mode is avoided. This operation is highly efficient and is referred to as zero copy. When the sendfile function is used, the kernel uses the file descriptor to access the file. The file descriptor is a non-negative integer. When an existing file or a newly-created file is opened, the kernel returns a file descriptor. For example, in an embodiment of the present application, a file descriptor is created when a shared file is mapped to the memory by using the mmap function. File reading and writing also requires the use of file descriptors to designate the to-be-read file and the to-be-written file.

The sendfile function is defined as:
include<sys/sendfile.h>
ssize_t senfile(int out_fd,int in_fd,off_t* offset,size_t count).

The in_fd parameter refers to the file descriptor of a to-be-read content, and the out_fd parameter refers to the file descriptor of a to-be-written content. The offset parameter designates from which position of a read-in file stream to start reading. If the offset parameter is empty, the default starting position of the read-in file stream is used. The count parameter designates the number of bytes transferred between the file descriptor in_fd and the file descriptor out_fd. in_fd must be a file descriptor that supports functions like the mmap function, that is, in_fd must point to a real file, not a socket and a pipe, whereas out_fd must be a socket before the Linux kernel version 2.6.33, and from the Linux version 2.6.33, out_fd may be any file. The system call sendfile ( ) first copies the data to the kernel buffer area through the direct memory access (DMA), and then the data is copied by the kernel directly to the kernel cache associated with another file descriptor or socket. There is no switching between the user mode and the kernel mode, and copying from one buffer area to another buffer area is completed directly in the kernel. Then, the DMA copies the data from the kernel buffer area directly to a protocol stack without switching and without the need to copy the data from the user mode to the kernel mode, since the data is in the kernel.

In this manner, when sendfile is used for copying a memory file cache, since mmap maps the content of the file to a segment memory, the file may be accessed in the manner of accessing the memory, avoiding the consumption of system performance due to content copying.

In another embodiment of the present application, the size of the shared memory 25 between the streaming media service process and the network card driver process is adjustable. The size of the shared memory 25, that is, the size of the mapped memory file 26, is adjusted as the cache of the received packet. The code stream of the received packet may be reordered according to encapsulation information (such as a packet order number and a time stamp) of the data packet, so as to solve the problem of possible disorder of the code stream of the received packet and ensure the normal order of the code stream of the packet for sending.

In the present application, the shared memory obtained in the manner of mapping a memory file and the sendfile function are used, so that the consumption of system performance due to the copying of a lot of contents between the kernel mode and the user mode is avoided. Through the method of the present application, when a CDN device provides the received media code stream to a large number of users for services, it is not required to copy a large amount of content data from the cache in the user mode to the cache in kernel mode, and the zero copy characteristic of the sendfile interface of the Linux system can be well used to provide media services. In this way, the consumption of the system due to media packet sending is reduced, and the processing efficiency of the CDN device is improved, so that the service capability of the device is improved, and the configuration cost of the CDN node devices is reduced.

In Internet applications, the method provided by the present application may be applied to any case where it is required to receive traffic from a network and to deliver the received traffic in large quantities.

In an embodiment of the present application, referring to FIG. 1 and FIG. 8, to support the HyperText Transfer Protocol Live Streaming (HLS) on-demand business over the Internet Over The Top (OTT) business, a multimedia content film source stored on the CDN system 1 is generally read according to HLS fragmentation format requirements, downloaded according to the HyperText Transfer Protocol (HTTP), carried in the Transmission Control Protocol (TCP) and sent to a requesting user terminal 13. However, the content requested by the user is not cached on the designated CDN node server 12, it is required to perform back-to-origin from an upper-level CDN node server 12 or the origin server 11, and then the media stream received through back-to-origin is delivered to the user terminal 13 requesting the service. In this scene, a large number of users need to be provided with services, and a piece of content is received through back-to-origin. By applying the media stream delivery method described in the preceding embodiments, the capacity of the CDN node server 12 can be effectively improved, and the performance of the entire CDN system 1 can be improved.

In another embodiment of the present application, referring to FIG. 1 and FIG. 8, for the Internet Protocol Television (IPTV) business, the channel live business is a service type which must be basically supported. The CDN system 1 supporting the implementation of the channel unicast live business refers to that a piece of channel code stream is received from an encoder (not shown) or an upper-level CDN node server 12, and after media processing and caching by streaming media service software on the CDN node server 12, the channel code stream is delivered to a large number of user terminals 13. In this business scene, the path of code stream received by the CDN node server 12 is cached in a shared memory 25, mapped as a memory file 26, and finally sent to a large number of user terminals 13 by using sendfile to serve clients, so that the capacity of the cache server is also effectively improved and the performance of the CDN system is improved.

The present application is not only applicable to the preceding application scene, but also applicable to the application scene involving server packet reception and delivery with generality.

The present application provides an efficient media stream delivery method, and the CDN media processing software applying the method changes from originally sending a packet according to an original circular cache to sending a packet according to a shared memory, so that the technical problem is solved that a large number of copies from the cache in the user mode to the cache in the kernel mode exist in the original media stream delivery process, the consumption of the system is reduced, the service capability of the device is improved, and the cost of device configuration is further reduced.

The device embodiment described above is only illustrative, the units explained as separate components may or may not be physically separated, that is, may be located in one place or may be distributed over multiple network units. Part or all of these modules may be selected according to practical requirements to achieve the objects of the solutions in the embodiments.

All or part of the steps and the system in the method disclosed above may be implemented as software, firmware, hardware and appropriate combinations thereof. Some or all physical components may be implemented as software executed by a processor such as a central processing unit, a digital signal processor or a microprocessor, may be implemented as hardware, or may be implemented as integrated circuits such as application-specific integrated circuits. Such software may be distributed over computer-readable media. The computer-readable media may include computer storage media (or non-transitory media) and communication media (or transitory media). The term computer storage media include volatile and nonvolatile as well as removable and non-removable media implemented in any method or technology for storage of information (such as computer-readable instructions, data structures, program modules or other data). The computer storage media include, but are not limited to, a random-access memory (RAM), a read-only memory (ROM), an electrically erasable programmable read-only memory (EEPROM), a flash memory or another memory technology, a compact disc read-only memory (CD-ROM), a digital versatile disc (DVD) or another optical disc storage, a magnetic cassette, a magnetic tape, disk storage or another magnetic storage device, or any other medium used to store the desired information and accessible by a computer. Additionally, the communication media generally include computer-readable instructions, data structures, program modules, or other data in modulated data signals such as carriers or other transport mechanisms and may include any information delivery medium.

What is claimed is:

1. A media stream delivery method, applied to a content delivery network (CDN) node server which runs in a Linux operating system, wherein the CDN node server supports a channel unicast live business, and the CDN node server comprises a network card, and the Linux operating system comprises an architecture divided into a user mode and a kernel mode, and wherein the method comprises:
   receiving a data packet of a media stream, wherein the data packet is received by a network card driver process from the network card and written to a data cache area in the kernel mode of the network card;
   establishing a shared memory through a memory mapping function mmap provided by the Linux operating system, wherein data in the data cache area in the kernel mode of the network card is copied to the shared memory by a media packet reception process through a system call function recvmsg provided by the Linux operating system, and the shared memory is mapped as a memory file at the same time, wherein the shared memory refers to a memory area shared by an application cache area of a streaming media service software in the user mode and a packet sending buffer area of a network card driver process in the kernel mode;
   and
   responding to requests of multiple user terminals, reading the data packet of the media stream requested by the multiple user terminals from the memory file mapped by the shared memory by using a SENDFILE function provided by the Linux operating system, and submitting the data packet to the network card driver process for direct packet sending.

2. The method according to claim 1, further comprising:
   in a case where the received data packet comprises a plurality of data packets, adjusting a size of the shared memory to reorder the received data packets of the media stream.

3. The method according to claim 1, wherein the received data packet of the media stream is a real-time transport protocol (RTP) packet.

4. The method according to claim 1, wherein the received data packet of the media stream is a transport stream (TS) packet.

5. A non-transitory computer-readable storage medium storing computer-executable instructions for executing the media stream delivery method of claim 1.

6. A content delivery network (CDN) node server, which runs in a Linux operating system, wherein the CDN node server supports a channel unicast live business, and the CDN node server comprises a network card, and the Linux operating system comprises an architecture divided into a user mode and a kernel mode, wherein the CDN node server further comprises a memory, a processor and a computer program stored in the memory and executable by the processor, wherein the processor, when executing the computer program, is configured to:
   receive a data packet of a media stream, wherein the data packet is received by a network card driver process from the network card and written to a data cache area in the kernel mode of the network card;
   establish a shared memory through a memory mapping function mmap provided by the Linux operating system, wherein data in the data cache area in the kernel mode of the network card is copied to the shared memory by a media packet reception process through a system call function recvmsg provided by the Linux operating system, and the shared memory is mapped as a memory file at the same time, wherein the shared memory refers to a memory area shared by an application cache area of a streaming media service software in the user mode and a packet sending buffer area of a network card driver process in the kernel mode;
   and
   respond to requests of multiple user terminals, read the data packet of the media stream requested by the multiple user terminals from the memory file mapped by the shared memory by using a SENDFILE function provided by the Linux operating system, and submit the data packet to the network card driver process for direct packet sending.

7. The CDN node server according to claim 6, the processor is further configured to:
   in a case where the received data packet comprises a plurality of data packets, adjust a size of the shared memory to reorder the received data packets of the media stream.

8. The CDN node server according to claim 6, wherein the received data packet of the media stream is a real-time transport protocol (RTP) packet.

9. The CDN node server according to claim 6, wherein the received data packet of the media stream is a transport stream (TS) packet.

10. A content delivery network (CDN) system, comprising an origin server, a CDN node server and multiple user terminals, wherein the CDN node server is configured to receive a media stream from the origin server for delivery to the multiple user terminals, the CDN node server which runs in a Linux operating system, wherein the CDN node server supports a channel unicast live business, and the CDN node server comprises a network card, and the Linux operating system comprises an architecture divided into a user mode and a kernel mode, the CDN node server further comprises a memory, a processor and a computer program stored in the memory and executable by the processor, wherein the processor, when executing the computer program, is configured to:

receive a data packet of the media stream, wherein the data packet is received by a network card driver process from the network card and written to a data cache area in the kernel mode of the network card;

establish a shared memory through a memory mapping function mmap provided by the Linux operating system, wherein data in the data cache area in the kernel mode of the network card is copied to the shared memory by a media packet reception process through a system call function recvmsg provided by the Linux operating system, and the shared memory is mapped as a memory file at the same time, wherein the shared memory refers to a memory area shared by an application cache area of a streaming media service software in the user mode and a packet sending buffer area of a network card driver process in the kernel mode; and respond to requests of the multiple user terminals, read the data packet of the media stream requested by the multiple user terminals from the memory file mapped by the shared memory by using a SENDFILE function provided by the Linux operating system, and submit the data packet to the network card driver process for direct packet sending.

11. The CDN system according to claim 10, the processor is further configured to:

in a case where the received data packet comprises a plurality of data packets, adjust a size of the shared memory to reorder the received data packets of the media stream.

12. The CDN system according to claim 10, wherein the received data packet of the media stream is a real-time transport protocol (RTP) packet.

13. The CDN system according to claim 10, wherein the received data packet of the media stream is a transport stream (TS) packet.

* * * * *